(12) United States Patent
Heitplatz et al.

(10) Patent No.: US 7,604,252 B2
(45) Date of Patent: Oct. 20, 2009

(54) KNEE AIRBAG

(75) Inventors: Frank Heitplatz, Köln (DE); Johannes A. Varcus, Sprockhövel (DE)

(73) Assignee: Ford Global Technologies, LLC, Dearborn, MI (US)

(*) Notice: Subject to any disclaimer, the term of this patent is extended or adjusted under 35 U.S.C. 154(b) by 265 days.

(21) Appl. No.: 11/676,465

(22) Filed: Feb. 19, 2007

(65) Prior Publication Data
US 2007/0200321 A1 Aug. 30, 2007

(30) Foreign Application Priority Data
Feb. 24, 2006 (DE) ........................ 10 2006 008 756

(51) Int. Cl.
*B60R 21/20* (2006.01)
*B60R 21/203* (2006.01)
*B60R 21/205* (2006.01)
*B60R 21/233* (2006.01)

(52) U.S. Cl. .................... 280/730.1; 280/729; 280/732; 280/743.2

(58) Field of Classification Search .............. 280/730.1, 280/753, 728.2, 728.3, 732, 729, 743.2
See application file for complete search history.

(56) References Cited

U.S. PATENT DOCUMENTS

| | | | |
|---|---|---|---|
| 7,147,247 B2 * | 12/2006 | Hayakawa | 280/740 |
| 7,232,149 B2 * | 6/2007 | Hotta et al. | 280/730.1 |
| 2003/0107206 A1 * | 6/2003 | Takimoto et al. | 280/730.1 |
| 2005/0057028 A1 * | 3/2005 | Hayakawa | 280/740 |
| 2005/0062265 A1 * | 3/2005 | Hotta et al. | 280/730.1 |
| 2005/0230941 A1 * | 10/2005 | Takimoto et al. | 280/730.1 |

FOREIGN PATENT DOCUMENTS

| | | |
|---|---|---|
| DE | 199 00 592 A1 | 7/2000 |
| EP | 1 300 300 A1 | 4/2003 |
| EP | 1531098 A1 * | 5/2005 |
| WO | 0249977 A2 | 6/2002 |
| WO | 03049977 A2 | 6/2003 |

* cited by examiner

*Primary Examiner*—Paul N. Dickson
*Assistant Examiner*—George D. Spisich
(74) *Attorney, Agent, or Firm*—Frank A. MacKenzie; Brooks Kushman P.C.

(57) ABSTRACT

The invention relates to a driver's knee airbag (1), in particular for a motor vehicle, with a gas generator (2), a plurality of chambers (5, 6, 7) and catch straps (3, 4). So that it deploys better and provides better protection for a vehicle occupant, in particular the driver, in the event of a crash, it comprises a first catch strap (3) dividing the airbag essentially horizontally, and two catch straps (4) extending essentially vertically from the first catch strap (3). The space between the steering column and the knees of the driver is therefore rapidly filled by the airbag in the event of a crash.

13 Claims, 3 Drawing Sheets

KNEE AIRBAG

BACKGROUND

1. Technical Field

The invention relates to a driver's knee airbag, in particular for a motor vehicle, with a gas generator, a plurality of chambers and catch straps.

2. Background Art

The airbags known in general from the prior art are intended to protect the vehicle occupants against injuries in the event of an impact. It is therefore important that the airbags deploy rapidly and provide optimum protection. Over the course of progressive development of safety devices in the motor vehicle, in an ever greater number of vehicles use is made of what is referred to as a knee airbag which, in addition to the improved restraint function of the particular occupant, also protects the latter, in particular the driver, from contact with the lower structures, such as the steering column. For this purpose, it is necessary to develop special airbags tailored to these requirements.

DE 199 00 592 A1 describes a knee-supporting device, in which a covering is arranged between the airbag and the vehicle occupant. In the event of an impact, the covering is displaced towards the steering wheel. In this construction, the vehicle occupant is pressed against the covering. However, this construction is relatively complicated and therefore expensive.

The applicant's own unpublished application DE 103 53 228 discloses a knee airbag which, owing to the particular arrangement of the catch straps, has an inflation sequence in which first of all a central high pressure chamber and subsequently lateral low pressure chambers are filled. However, it has turned out that, despite the good protective effect of airbags of this type, there is still a need for improvement.

SUMMARY

The invention has the object of developing an airbag of the type mentioned at the beginning to the effect that it deploys better and provides better protection for a vehicle occupant, in particular the driver, in the event of a crash.

In accordance with one described embodiment of the present invention, a driver's knee airbag for a motor vehicle comprises an outer envelope defining a bag interior, a first catch strap extending laterally across the bag interior to define a lower pressure chamber, and second and third catch straps extending upwardly from laterally spaced points adjacent an upper surface of the first catch strap. The second and third catch straps thus divide the upper portion of the bag into a central pressure chamber and first and second outer pressure chambers. The first catch strap has a first and a second gas passage opening formed therethough at laterally spaced locations, one communicating with each of the first and second outer pressure chambers. A gas generator located inside of the lower pressure chamber, gases released by the gas generator in response to a collision or impending collision acting to inflate the airbag.

Owing to the fact that the airbag comprises a first catch strap dividing the airbag essentially horizontally, and two catch straps extending essentially vertically from the first catch strap, it is possible to rapidly fill the space between the steering column and the knees of the driver by the airbag in the event of a crash. In addition, the shape of the inflated airbag can therefore be matched better to the steering column and its surroundings, which results in greater protection for the driver. Furthermore, in a departure from the prior art, the inflation sequence of the airbag can change in such a manner that it first of all deploys in the lateral direction and subsequently inflates in the direction of the steering wheel, so that the knees of the driver are already protected at a particularly early time.

It has namely been recognized that a particularly good restraining function is achieved by a knee airbag if the latter already completely fills the space between the steering column and the occupant's knee before the occupant moves in the event of a crash. In addition, there is the problem that the space between the steering column and the occupant's knee changes continuously, for example depending on the selected position of the legs or knees with respect to the steering column. This is not possible with the airbags from the prior art which only have catch straps running horizontally, since the latter, as seen over the width, have an approximately constant thickness.

The first catch strap is preferably provided in such a manner that a first pressure chamber extending essentially horizontally over the width of the airbag is formed, and the two catch straps extending essentially vertically from the first catch strap are provided in such a manner that two outer pressure chambers and a central pressure chamber are formed, and that a gas outlet opening of the gas generator is arranged in the first pressure chamber. With a preferred embodiment of this type, the airbag can be particularly readily molded around the steering column and at the same time a smaller volume which is to be inflated can be set, so that correspondingly small gas generators can be used.

The first catch strap is advantageously arranged in such a manner that the first pressure chamber is arranged below the further pressure chambers.

It is also expedient if the vertically extending catch straps are arranged in such a manner that the outer pressure chambers in each case have a larger volume than the central pressure chamber, since a smaller volume is sufficient in the central region of the airbag on account of the steering column arranged there.

In order to achieve a rapid deployment of the airbag in the outer pressure chambers too, the first catch strap can have gas passage openings which preferably connect the first pressure chamber in each case to the outer pressure chambers. A rapid propagation of the gas pressure is therefore achieved.

In the event of a crash, the airbag therefore engages around the steering column, i.e. the outer pressure chambers are in each case arranged at the sides of the steering column and the central small pressure chamber is arranged around the steering column. The volume of the airbag is therefore distributed to where it is useful: a small volume or thickness on/in front of the steering column and a larger volume or thickness between knees and steering column/dashboard.

In order to achieve the desired inflation sequence, it is expedient if the first pressure chamber is arranged upstream of the other pressure chambers in the inflation sequence.

Furthermore, it is favorable if the outer pressure chambers are also arranged upstream of the central pressure chamber in the inflation sequence.

Expediently, the airbag is therefore configured in such a manner that it first of all, in the region of the first pressure chamber, inflates essentially transversely to the direction of the steering column and, subsequently, in the region of the further pressure chambers, inflates in the direction of the steering column.

BRIEF DESCRIPTION OF THE DRAWINGS

Further features, details and advantages of the invention emerge from the description below of an exemplary embodiment with reference to the drawing, in which.

DETAILED DESCRIPTION

Figure 1:
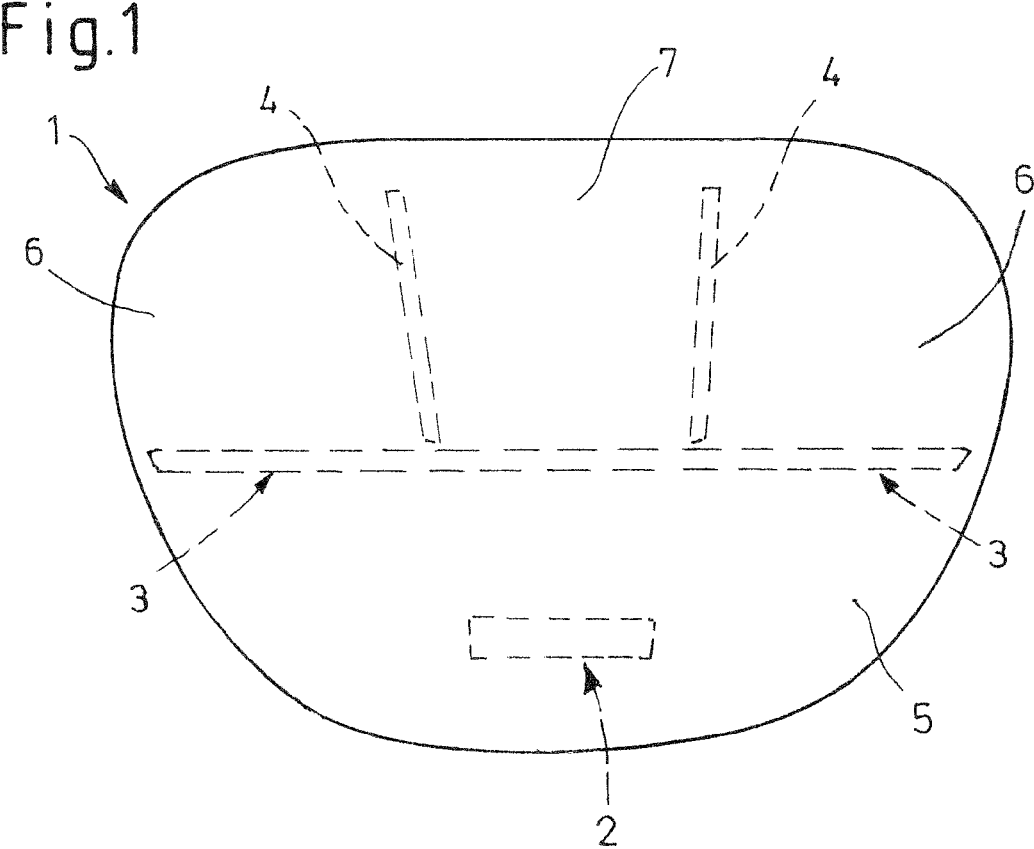
FIG. 1 shows a diagrammatic plan view of an airbag according to the invention.

The figures show a driver's knee airbag, which is referred to as a whole by 1, for a motor vehicle, with a gas generator 2, a plurality of chambers 5, 6, 7 and catch straps 3, 4.

The airbag 1 comprises an envelope which defines a bag interior. For purposes of description only, the envelope may be said to comprise left and right lateral walls, and a top wall. The lateral and top walls are not necessarily separate pieces, nor are they necessarily flat, nor are there necessarily distinct boundaries between the walls, as they may blend gradually into one another. A first catch strap 3 extends laterally across the interior of the airbag to divide it essentially horizontally. The lateral ends of the first catch strap 3 may contact and/or be sealed with the left and right lateral walls of the envelope. Alternatively, the lateral ends of the first catch straps may be spaced from the left and right lateral walls to leave gaps. Two catch straps 4 have lower ends adjacent the upper surface of the first catch strap 3 and extend upward from the first catch strap 3. Upper ends of the catch straps 4 may be spaced from the top wall of the envelope to leave gaps. In this case, the catch straps 4 form an angle which widens slightly upward. As emerges in particular from FIG. 2, each catch strap 4 can likewise form an angle widening from the bottom upward, i.e. can have a wedge shape.

The terms "top," "bottom," "left," "right," and "lateral," refer here in each case to the orientation of the inflated airbag 1 with respect to the steering wheel or the motor vehicle in which said airbag is used.

By means of this catch strap arrangement, a plurality of pressure chambers are formed: a first or lower pressure chamber 5 extending laterally over the width and the depth of the airbag 1, two outer pressure chambers 6 and a central pressure chamber 7. In this case, at least one gas outlet opening 9 of the gas generator 2 is arranged in the first pressure chamber 5.

The first catch strap 3 is arranged in such a manner that the first pressure chamber 5 is situated below the other pressure chambers 6, 7.

The vertically extending catch straps 4 are arranged in such a manner that the outer pressure chambers 6 in each case have a larger volume than the central pressure chamber 7, so that, in the inflated state, the airbag 1 nestles around the steering column 10 (cf. FIGS. 3 and 4) where a smaller volume is sufficient or is necessary (cf. FIG. 4), since the space available between airbag 1 and driver is smaller here on account of the space taken up by the steering column 10. In addition, a positioning of the airbag is achieved such that the latter does not slip if non-uniformly loaded.

In order to achieve a rapid deployment of the airbag 1 in the outer pressure chambers 6 too, the first catch strap 3 can have gas passage openings 8 which connect the first pressure chamber 5 in each case to the outer pressure chambers 6. A rapid propagation of the gas pressure also into the other chambers is therefore achieved.

Figure 2:
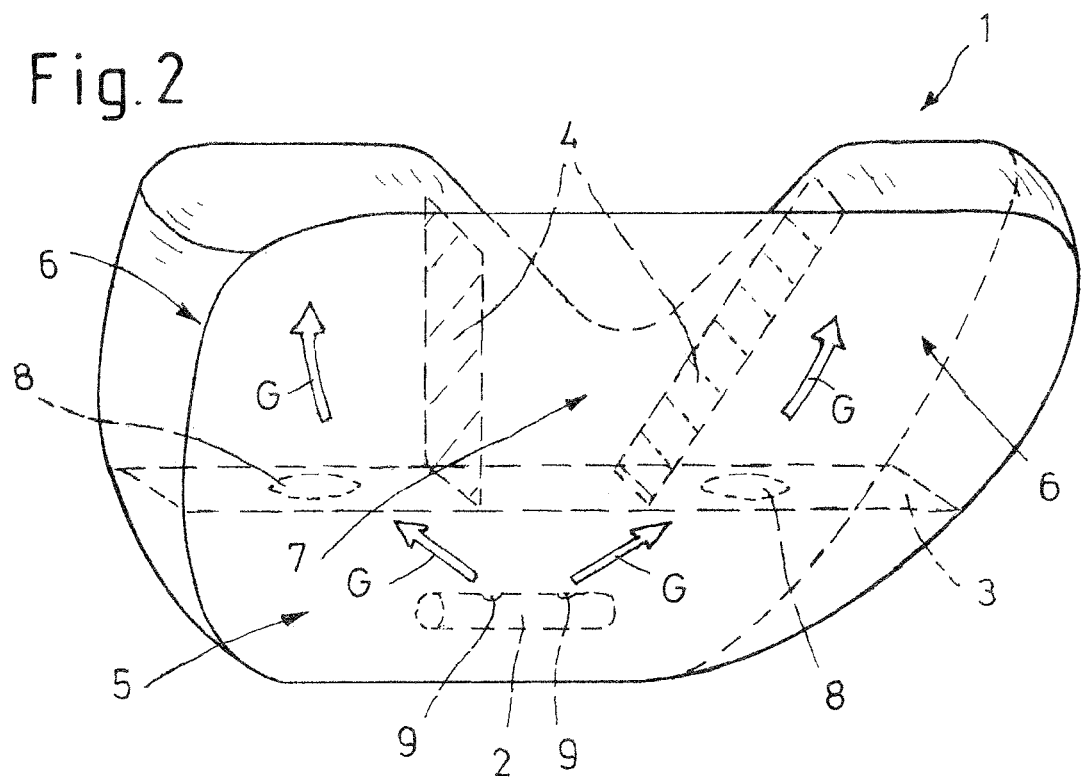
FIG. 2 shows a perspective view of the airbag from FIG. 1.

As is illustrated in FIG. 2 by means of the arrows G, the propagation of the gas pressure from the gas generator 2 is directed in a specific manner in the event of a crash.

Figure 3:
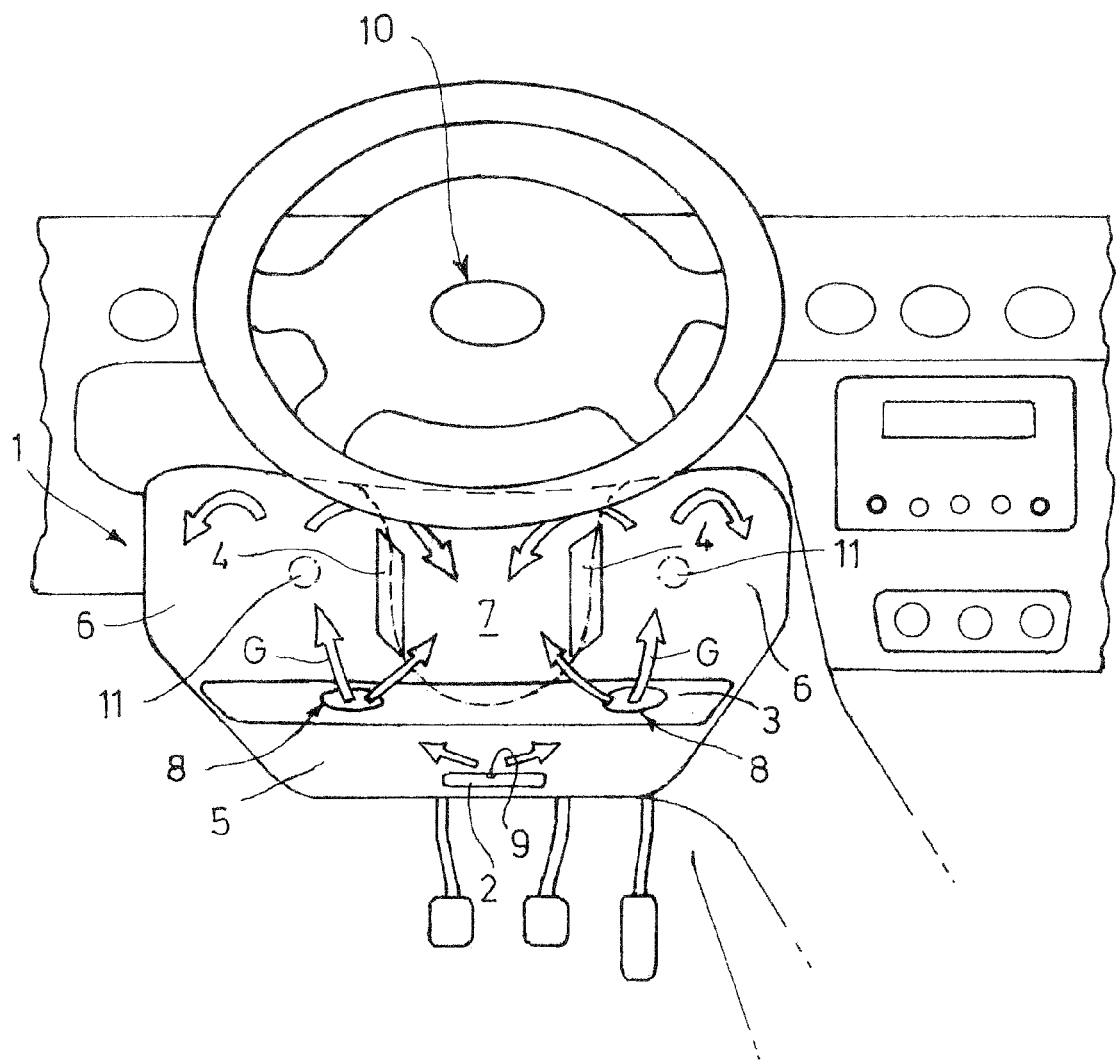
FIG. 3 shows a diagrammatic view of the airbag in the installed state in a direction looking at the steering wheel during the inflation.
Figure 4:
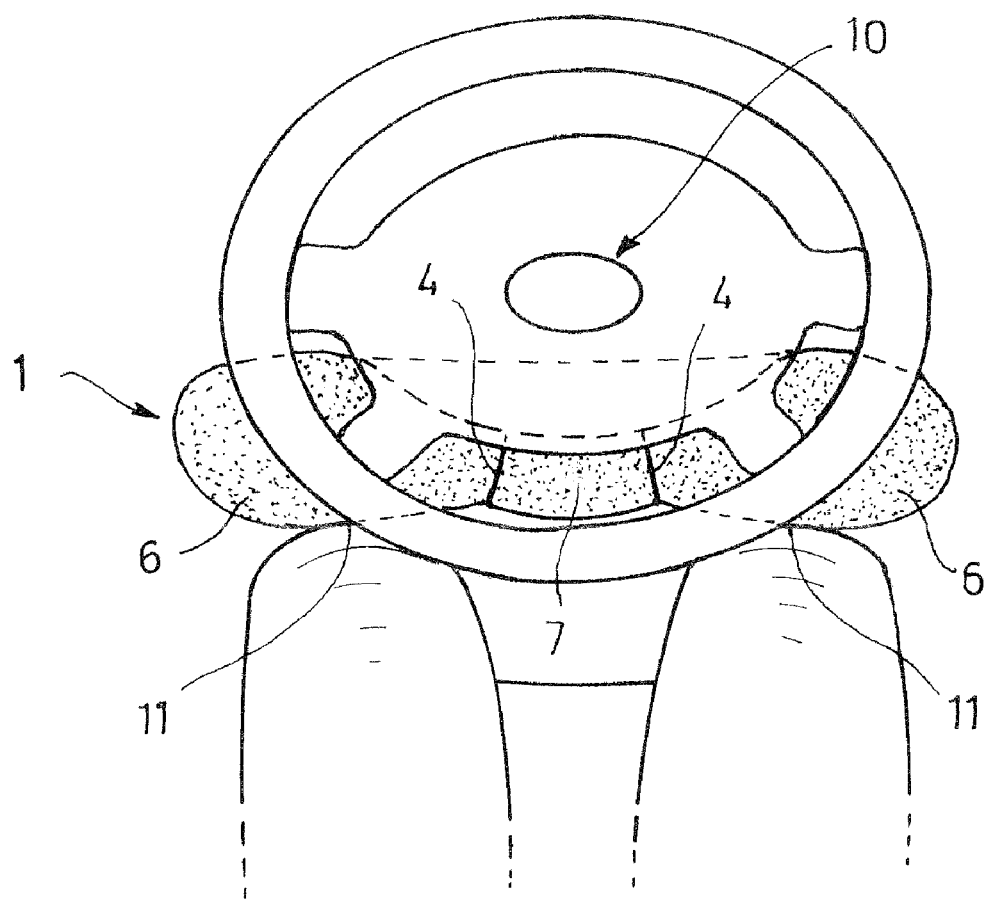
FIG. 4 shows a cross section through the airbag from FIG. 3 along the longitudinal axis of the steering column.

The space between the steering column 10 and dashboard and the knees of the driver is therefore filled rapidly by the airbag 1 in the event of a crash (cf. FIGS. 3 and 4).

The inflation sequence of the airbag 1 takes place first of all in the lateral direction by "unfolding" or inflation in the region of the first pressure chamber 5, approximately transversely to the longitudinal axis of the steering column 10, and subsequently in the direction of the steering wheel by inflation and deployment of the respective outer pressure chambers 6 and, finally, of the central pressure chamber 7, so that the knees of the driver are already protected at a particularly early time (cf. FIG. 3).

The airbag 1 therefore engages around the steering column 10 in the event of a crash, with the outer pressure chambers 6 being arranged in each case at the sides of the steering column 10 and the central pressure chamber 7 being arranged around the steering column 10.

The airbag 1 preferably has a design which increases in cross section from the bottom upward (cf. FIG. 2), so that the first pressure chamber 5 likewise has a smaller cross section than the outer pressure chambers 6 which take on the actual protection of the driver and of his knees. The typical impact regions of the knees are indicated in FIGS. 3 by 11.

While the best mode for carrying out the invention has been described in detail, those familiar with the art to which this invention relates will recognize various alternative designs and embodiments for practicing the invention as defined by the following claims.

LIST OF DESIGNATIONS

1 Airbag
2 Gas generator
3 Horizontal catch strap
4 Vertical catch strap
5 First pressure chamber
6 Outer pressure chamber
7 Central pressure chamber
8 Gas passage opening
9 Gas outlet opening
10 Steering column
11 Knee impact region
G Gas flow

The invention claimed is:

1. A driver's knee airbag for a motor vehicle, comprising:
a first catch strap extending laterally across an interior of the airbag to define therebelow a lower pressure chamber, the first catch strap having at least a first and a second gas passage opening formed therethough at laterally spaced locations;
a second catch strap having a lower end adjacent an upper surface of the first catch strap between the first and second gas passages and extending upwardly therefrom;
a third catch strap spaced laterally from the second catch strap and having a lower end adjacent an upper surface of the first catch strap between the first and second gas passages and extending upwardly therefrom; and a gas generator located inside of the lower pressure chamber.

2. The driver's knee airbag according to claim 1, wherein the second catch strap and the third catch strap are spaced from one another by a first distance such that a central pressure chamber located above the first catch strap and between the second and third catch straps is smaller than a first outer pressure chamber located above the first catch strap and between the second catch strap and a first lateral wall of the airbag, and the center pressure chamber is smaller than a second outer pressure chamber located above the first catch strap and between the third catch strap and a second lateral wall of the airbag opposite from the first lateral wall.

3. The driver's knee airbag according to claim 2, wherein the first outer pressure chamber and the second outer pressure chamber are equal in volume.

4. The driver's knee airbag according to claim 1, wherein the first catch strap has first and second ends sealed with the first and second lateral walls of the airbag respectively.

5. The driver's knee airbag according to claim 1, wherein the lower ends of the second and third catch straps are spaced from the upper surface of the first catch strap to define gaps through which inflation gases from the gas generator may pass.

6. The driver's knee airbag according to claim 1, wherein upper ends of the second and third catch straps are spaced from an upper wall of the airbag to define upper gaps through which inflation gases from the gas generator may pass.

7. The driver's knee airbag according to claim 1, wherein the central pressure chamber and upper wall are shaped to fit around a lower portion of a steering column.

8. A driver protection assembly for a motor vehicle, comprising:
    a steering column; and
    a knee airbag disposed below the steering column and comprising:
        an outer envelope defining a bag interior;
        a first catch strap extending laterally across the bag interior to define therebelow a lower pressure chamber, the first catch strap having at least a first and a second gas passage opening formed therethough at laterally spaced locations;
        a second catch strap extending upwardly in the bag interior from a first point adjacent an upper surface of the first catch strap between the first and second gas passages; and
        a third catch strap spaced laterally from the second catch strap and extending upwardly in the bag interior from a second point adjacent the upper surface of the first catch strap between the first and second gas passages, the second catch strap and the third catch strap spaced from one another by a first distance to define: a) a first outer pressure chamber above the first catch strap and between the second catch strap and a first lateral wall of the airbag; b) a second outer pressure chambers above the first catch strap and between the third catch strap and a second lateral wall of the airbag opposite from the first lateral wall; and c) a central pressure chamber above the first catch strap and between the second and third catch straps, the central pressure chamber being located immediately below the steering column; and
    a gas generator located inside of the lower pressure chamber and generating inflation gases.

9. The driver protection assembly according to claim 8, wherein the central pressure chamber has a smaller volume than each of the first and second outer pressure chambers.

10. The driver's knee airbag according to claim 8, wherein the first outer pressure chamber and the second outer pressure chamber are equal in volume.

11. The driver's knee airbag according to claim 8, wherein the first catch strap has first and second ends sealed with the first and second lateral walls of the airbag respectively.

12. The driver's knee airbag according to claim 8, wherein the lower ends of the second and third catch straps are spaced from the upper surface of the first catch strap to define gaps through which the inflation gases may pass.

13. The driver's knee airbag according to claim 8, wherein upper ends of the second and third catch straps are spaced from an upper wall of the airbag to define upper gaps through which the inflation gases may pass.

* * * * *